(12) United States Patent
Chang et al.

(10) Patent No.: US 6,728,414 B1
(45) Date of Patent: Apr. 27, 2004

(54) DE-BLOCKING METHOD AND APPARATUS

(75) Inventors: Joon-ho Chang, Seoul (KR); Jeong-kwon Kim, Gwangmyung (KR); Choong-woong Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/353,058

(22) Filed: Jul. 13, 1999

(30) Foreign Application Priority Data

Nov. 25, 1998 (KR) ............................ 98-50689

(51) Int. Cl.⁷ ............................................. G06K 9/40
(52) U.S. Cl. .................. 382/254; 358/3.26; 382/261; 382/268; 382/275; 382/250
(58) Field of Search ................. 358/179, 3.26, 358/426.07; 382/232, 239, 268, 275, 250, 254, 300, 261; 375/240.25, 240.29, 240.2

(56) References Cited

U.S. PATENT DOCUMENTS

| | | | |
|---|---|---|---|
| 5,367,385 A | * 11/1994 | Yuan .......................... | 358/465 |
| 5,408,337 A | * 4/1995 | Kanda ......................... | 358/447 |
| 5,452,104 A | * 9/1995 | Lee ......................... | 358/426.14 |
| 5,479,211 A | * 12/1995 | Fukuda .................. | 375/240.03 |
| 5,677,736 A | * 10/1997 | Suzuki et al. .......... | 375/240.24 |
| 5,729,631 A | * 3/1998 | Wober et al. .............. | 382/232 |
| 5,737,451 A | * 4/1998 | Gandhi et al. ............. | 382/268 |
| 5,796,875 A | * 8/1998 | Read .......................... | 382/261 |
| 5,850,294 A | * 12/1998 | Apostolopoulos et al. .................. | 358/426.14 |
| 5,887,084 A | * 3/1999 | Wober et al. ............... | 382/250 |
| 6,006,276 A | * 12/1999 | MacCormack et al. ..... | 709/253 |
| 6,028,967 A | * 2/2000 | Kim et al. ................ | 382/268 |
| 6,057,882 A | * 5/2000 | van den Branden Lambrecht et al. .......... | 348/192 |
| 6,064,776 A | * 5/2000 | Kikuchi et al. ............. | 382/260 |
| 6,222,881 B1 | * 4/2001 | Walker ................... | 375/240.03 |
| 6,539,060 B1 | * 3/2003 | Lee et al. ............... | 375/240.29 |
| 2002/0051496 A1 | * 5/2002 | Hashimoto ............. | 375/240.27 |
| 2002/0191694 A1 | * 12/2002 | Ohyama et al. ....... | 375/240.01 |

FOREIGN PATENT DOCUMENTS

| | | | | |
|---|---|---|---|---|
| JP | 405316494 | * 11/1993 | .......... | H04N/7/133 |
| JP | 9-261677 | 10/1997 | | |
| JP | 1132333 | * 2/1999 | ............ | H04N/7/30 |
| JP | 200295615 | * 10/2000 | ............ | H04N/7/30 |
| JP | 200299860 | * 10/2000 | ............ | H04N/7/30 |
| WO | WO9922509 | * 5/1999 | | |

OTHER PUBLICATIONS

De-blocking Algorithm by Spatial Linear Filtering and New Interpolation; J. Kim et al; 1998, vol. 1; 5 pages.

* cited by examiner

*Primary Examiner*—Mark Wallerson
*Assistant Examiner*—Melanie Vida
(74) *Attorney, Agent, or Firm*—Sughrue Mion, PLLC

(57) ABSTRACT

A de-blocking method and apparatus in which a block classifier determines whether the received decoded image is a planar surface or a complex surface. A first correction value calculator calculates correction values for block boundary pixels using a first filtering coefficient when the decoded image is a planar surface, an interpolator provides first correction values for pixels on the block boundary, and a second correction value calculator calculates second correction values for some block boundary pixels using a second filtering coefficient when the decoded image is a complex surface. A corrector provides a corrected image by correcting the received decoded image using the first correction values when the received decoded image is a planar surface, or using the second correction values when the received decoded image is a complex surface. Blocking artifacts are effectively removed to prevent discontinuity between boundaries of the decoded image obtained by decoding a block-based coded image, while maintaining the edge and the texture of the image.

22 Claims, 4 Drawing Sheets

DE-BLOCKING METHOD AND APPARATUS

BACKGROUND OF THE INVENTION

1. Field of the Invention

The present invention relates to the improvement of image quality, and more particularly, to a method and apparatus for effectively removing a blocking artifact occurring during block-based coding.

2. Description of the Related Art

In recent apparatuses for coding and transmitting video and/or audio signals or decoding the same, a block-based transform coding method is widely used. However, this block-based transform coding method leads to degradation of the image quality since an increase in the compression rate of an image causes a blocking artifact. This is because the loss of transform coefficients is not accurately compensated for in the course of independent quantization of each block during decoding.

In FIG. 1, a flowchart for illustrating a conventional de-blocking method, a decoded image obtained by decoding a block-based coded image is received in step S101, and the degree of a blocking artifact is estimated using pixels existing at the block boundary of the received decoded image, in step S102. Here, a typical blocking artifact estimation is made by using a value obtained by averaging the squared differences between pixel values at the blocking boundary. The magnitude of a blocking artifact is reduced by correcting the decoded image using an estimated value to determine the degree of the blocking artifact in step S102, and a corrected image is thus provided, in step S103. The degree of de-blocking with respect to the corrected image is determined in step S104. If the blocking artifact is satisfactorily removed, a de-blocked decoded image is output, in step S105. Otherwise, step S102 is performed again to repeat the above steps.

Conventional de-blocking methods can be classified into repetitive methods of repeating the de-blocking process as shown in FIG. 1, and non-repetitive methods. In repetitive de-blocking methods, there is a projection onto convex sets (POCS) method for obtaining a more natural image by repetitively projecting a decoded image onto convex sets by utilizing the advance knowledge of the smooth characteristics and coefficient range of an original image for post-processing. A duplicate transform method, for reducing the discontinuity at the block boundary by allowing a small amount of overlap between blocks during coding and decoding, is also a repetitive de-blocking method. These repetitive de-blocking methods have a high de-blocking performance, but require very large amounts of calculation such that it is difficult to use these methods for real time applications or realize them as hardware.

The discontinuity at the block boundary locally has a waveform similar to a staircase wave, and this denotes generation of many high-frequency components in the frequency domain. Therefore, a non-repetitive de-blocking method, such as, a low-pass filtering on boundaries for reducing the blocking artifact by removing high frequency components by low-pass filtering pixels on block boundaries, is very simple but does not have a high de-blocking performance.

SUMMARY OF THE INVENTION

To solve the above problems, it is an objective of the present invention to provide a high performance non-repetitive de-blocking method and apparatus which can be applied in real time.

It is another objective of the present invention to provide a de-blocking method and apparatus to prevent discontinuity between boundaries of a decoded image obtained from a block-based coded image while maintaining the edge and the texture.

Accordingly, to achieve the above objectives, there is provided a de-blocking method of de-blocking a decoded image obtained by decoding a block-based coded image, the method comprising the steps of: (a) obtaining a first correction value by filtering pixels on a block boundary of the received decoded image using a first filtering coefficient corresponding to the case when the decoded image is a planar surface; (b) obtaining a second correction value by filtering pixels on a block boundary of the received decoded image using a second filtering coefficient corresponding to the case when the decoded image is a complex surface; and (c) providing a corrected image by correcting the received decoded image using the first correction value when the decoded image is a planar surface or using the second correction value when the decoded image is a complex surface.

To achieve the above objectives, there is provided a de-blocking apparatus for de-blocking a decoded image obtained by decoding a block-based coded image, the apparatus comprising: a block classifier for determining whether the received decoded image is a planar surface or a complex surface; a first correction value calculator for calculating correction values for block boundary pixels by filtering the block boundary pixels of the received decoded image using a first filtering coefficient when the decoded image is a planar surface; an interpolator for providing first correction values for pixels on the block boundary and within a block by bilinearly interpolating the pixels within a block using the correction values for the block boundary pixels; a second correction value calculator for calculating second correction values for some block boundary pixels by filtering the block boundary pixels of the received decoded image using a second filtering coefficient when the decoded image is a complex surface; and a corrector for providing a corrected image by correcting the received decoded image using the first correction values when the received decoded image is a planar surface or the second correction values when the received decoded image is a complex surface.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1:
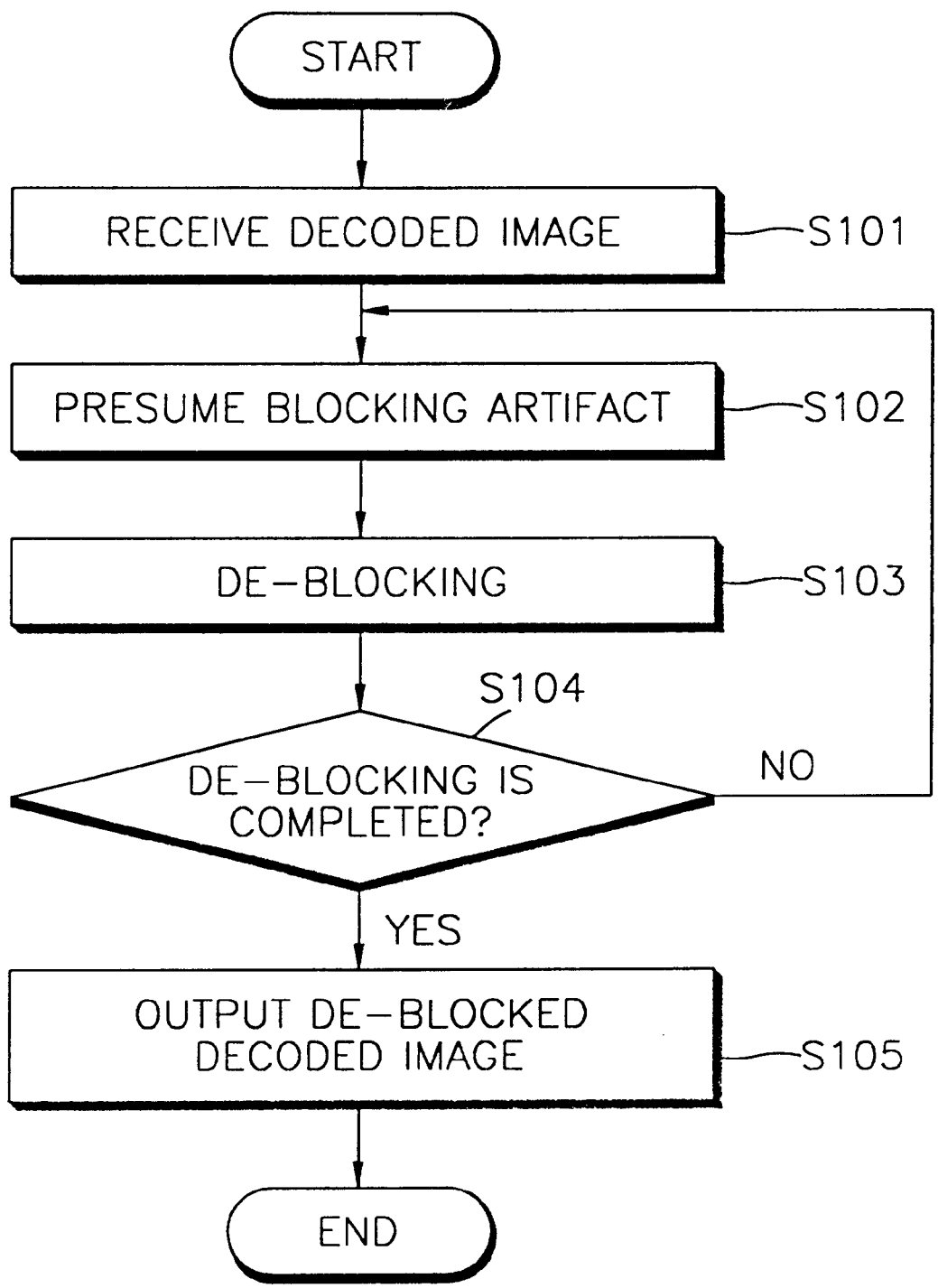
FIG. 1 is a flowchart for illustrating a conventional de-blocking method.
Figure 2:
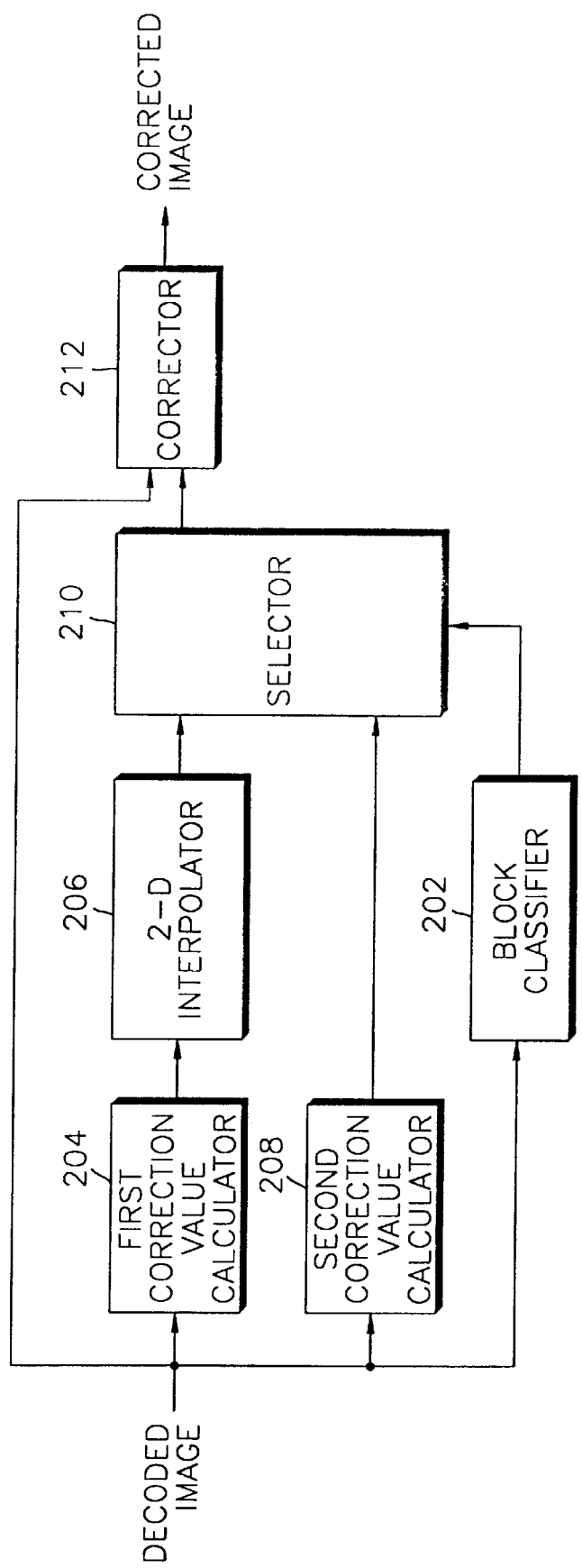
FIG. 2 is a block diagram of a de-blocking apparatus according to an embodiment of the present invention.

Referring to FIG. 2, a de-blocking apparatus according to an embodiment of the present invention includes a block classifier 202, a first correction value calculator 204, a two-dimensional (2-D) interpolator 206, a second correction value calculator 208, a selector 210, and a corrector 212. The block classifier 202 determines whether the block for an input decoded image is a planar surface or a complex surface. The first correction value calculator 204 filters the received decoded image using a first filtering coefficient for a planar surface to de-block pixels on a boundary. The 2-D interpolator 206 de-blocks pixels within the block of a planar surface. The second correction value calculator 208 filters the received decoded image using a second filtering coefficient for a complex surface to de-block some pixels on the block boundary. The selector 210 selects the output of the 2-D interpolator 206 if the decoded image classified by the block classifier 202 is a planar surface, or selects the output of the second correction value calculator 208 if the decoded image classified by the block classifier 202 is a complex surface, and provides the selected output to the corrector 212. The corrector 212 corrects a block artifact by applying the correction value selected by the selector 210 to the pixel value of the received decoded image.

Figure 3:
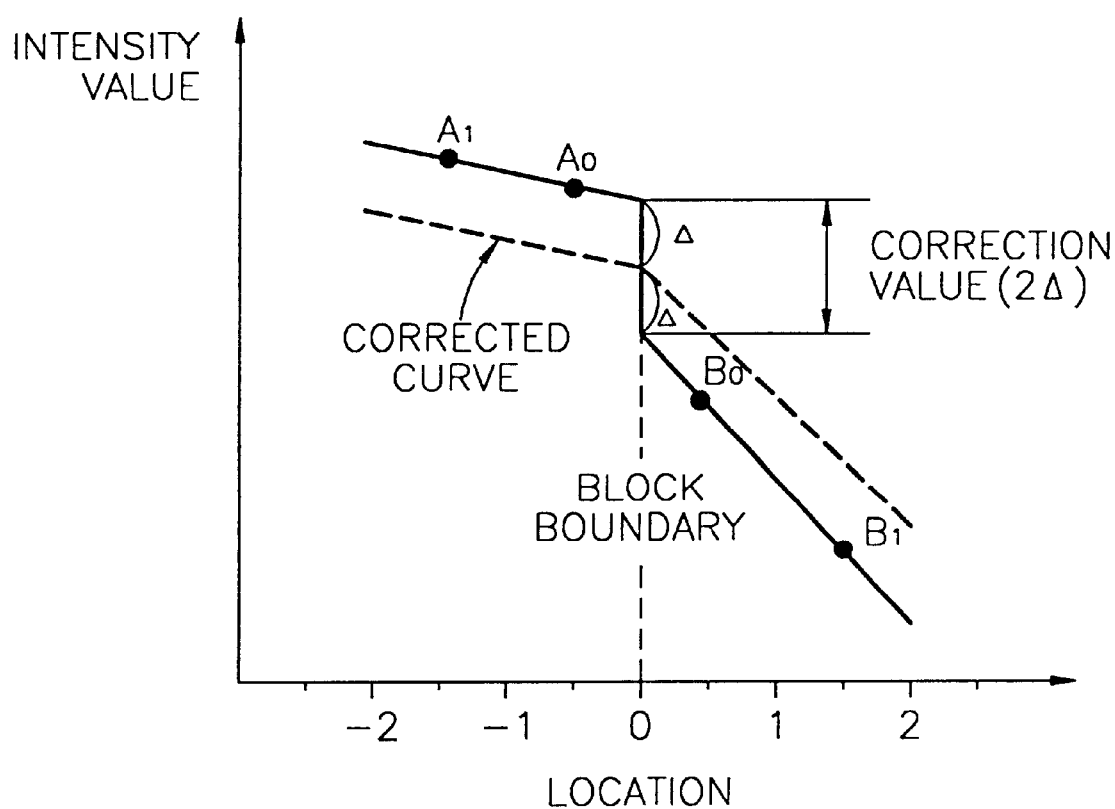
FIG. 3 is a graph showing an example of correction of two straight lines for securing continuity at a block boundary.

The operation of the apparatus of FIG. 2 will now be described in more detail referring to FIG. 3.

First, the block classifier 202 receives a decoded image obtained by decoding a block-based coded image and classifies blocks using the 2-D discrete cosine transform (DCT) coefficients of the decoded image blocks. That is, if a non-zero coefficient is included in the coefficients except for three coefficients having the lowest frequencies, i.e., a DC coefficient and AC coefficients at positions (0,1) and (1,0), among DCT coefficients, the block of the decoded image is classified as a complex surface. Otherwise, the block of the decoded image is classified as a planar surface. The block classifier provides a classification control signal to the selector 210.

Assuming that horizontal pixels over two blocks are A7, A6, A5, A4, A3, A2, A1, A0, B0, B1, B2, B3, B4, B5, B6 and B7, a block boundary exists between A0 and B0. On the assumption that 16 pixels exist along a boundary (16 pixels are assumed since 88 blocks are typically used for DCT), the first correction value calculator 204 obtains a correction value for pixels A0 and B0 corresponding to the block boundary as shown in FIG. 3 using the first filtering coefficients for a planar surface. That is, the correction value for boundary pixels A0 and B0 is calculated by filtering four pixels A1, A0, B0 and B1 on the boundary using the first filtering coefficients. The first filtering coefficient for a planar surface is given as follows:

filtering coefficient for A0/B0: −/+[1/4, −3/4, −1/4, 3/4].

Here, a negative sign (−) is applied to the calculated correction value for A0, and a positive sign (+) is applied to the calculated correction value for B0. That is, the results of filtering using the first filtering coefficient denote a discontinuity value (Δ) on the block boundary of FIG. 3. A discontinuous boundary can be corrected by subtracting Δ from pixel A0 of the received decoded image and adding Δ to pixel B0 of the received decoded image. Thus, the discontinuity value Δ, obtained by filtering using the first filtering coefficient is necessary for continuously connecting two straight lines to each other on the block boundary, on the assumption that A0 and A1 form one straight line and B0 and B1 form another straight line.

In the case of a planar surface, two boundaries exist on the horizontal line boundary of one block. That is, in the case of 16 pixels as described above, the space between A0 and B0 corresponds to one block boundary, and another boundary exists between A8 and B8. Accordingly, the 2-D interpolator 206 performs bilinear interpolation using the correction value for boundary pixels calculated by the first correction value calculator 204, thereby de-blocking pixels within a block. That is, the first correction value calculator 204 corrects planar surface pixels on block boundaries, and the 2-D interpolator 206 corrects planar surface pixels within each block.

The second correction value calculator 208 filters some pixels (e.g., A1, A0, B0 and B1) on block boundaries of the received decoded image using second filtering coefficients for a complex surface. The second filtering coefficients are given as follows:

filtering coefficient for A0/B0: −/+[1/8, −3/8, −1/8, 3/8], filtering coefficient for A1/B1:+/−[1/24, −1/8, −1/24, 1/8].

That is, the correction values of A0 and B0 for a complex surface are calculated by using a filtering coefficient half the size of the first filtering coefficient for a planar surface, wherein a negative sign (−) and a positive sign (+) are supplied respectively to the correction value for A0 and the correction value for B0. The correction values of A1 and B1 are calculated using a filtering coefficient one third the size of the filtering coefficient for A0 and B0, wherein a positive sign (+) and a negative sign (−) are supplied respectively to the correction value for A1 and the correction value for B1. Since both the first filtering coefficient for a planar surface and the second filtering coefficient for a complex surface are negative and positive integers, the correction values are simply calculated, and the loop filter configuration of the first and second correction value calculators 204 and 208 becomes simplified.

The selector 210 supplies the correction value for each corrected pixel on block boundaries and within blocks, output from the 2-D interpolator 206, to the corrector 212 if the decoded image classified by the block classifier 202 is a planar surface, or the selector 210 supplies the correction values for some pixels on the block boundary output from the second correction value calculator 208 if the classified decoded image is a complex surface. The corrector 212 provides a corrected image by adding a correction value selected by the selector 210 to the received decoded image.

In the de-blocking apparatus of the present invention, the first and second correction value calculators 204 and 208 calculate sign-free correction values, while the sign for a calculated correction value is given by the corrector 212.

Figure 4:
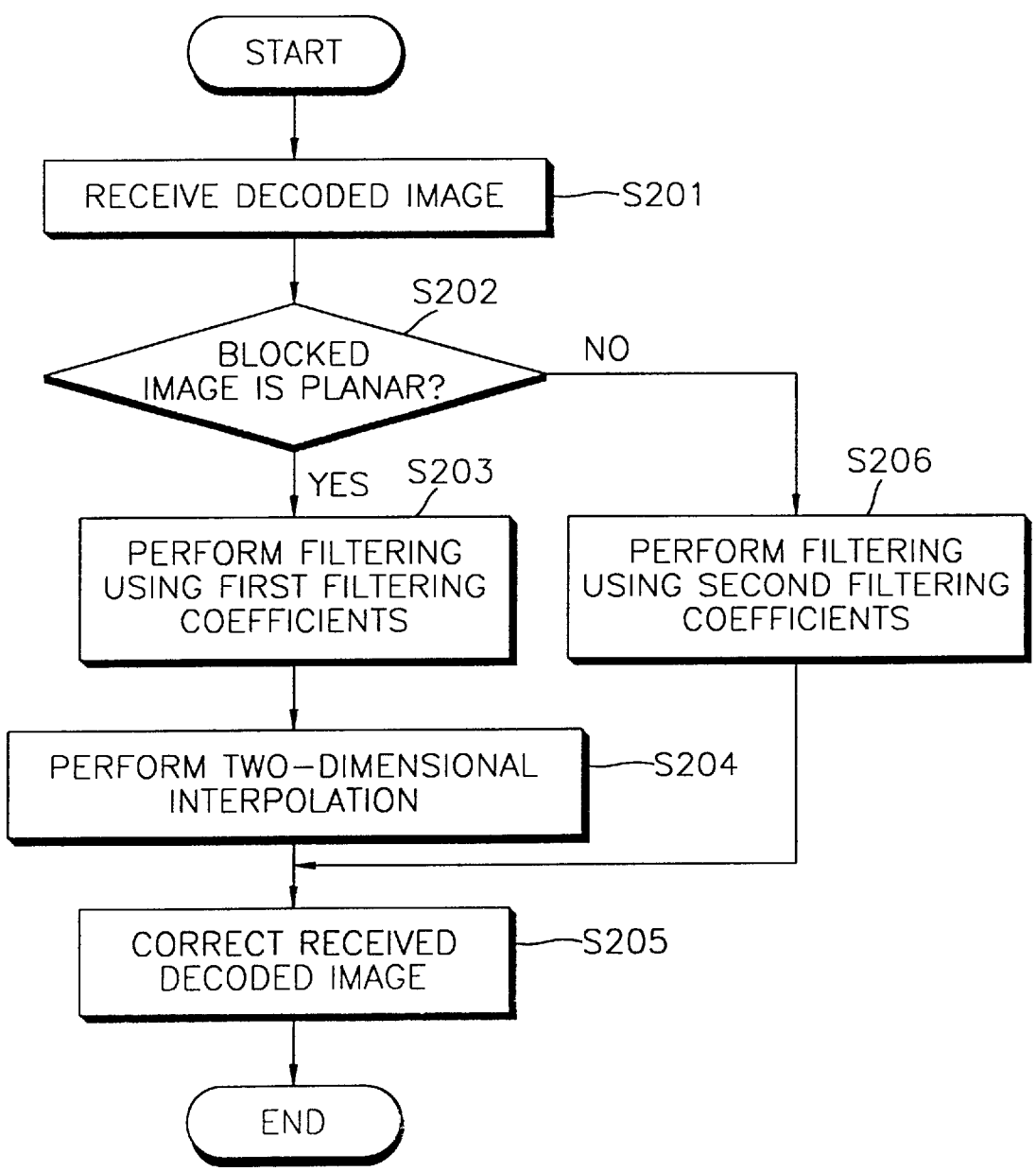
FIG. 4 is a flowchart for illustrating a de-blocking method according to an embodiment of the present invention.

In FIG. 4, a flowchart for illustrating a de-blocking method according to an embodiment of the present invention, a block-based coded decoding image is received in step S201. It is determined whether the received decoding image is a planar surface or a complex surface, in step S202. When the decoding image is a planar surface, the correction values for pixels on block boundaries are calculated by filtering the pixels on the block boundary using the first filtering coefficient, in step S203. When the decoded image is a planar surface, pixels within blocks are two-dimensionally interpolated using a bilinear interpolation method, in step S204. The correction values for pixels on the block boundary and within a block are all provided.

Meanwhile, when the decoding image is classified as a complex surface in step S202, the correction values for some pixels on the block boundary are calculated by filtering the pixels on the block boundary using the second filtering coefficient, in step S206. The thus-calculated correction values are added to the decoded image, and a corrected image is thus provided, in step S205.

The present invention is applicable to all kinds of block-based image coding systems based on DCT, i.e., coding systems which use image compression standards such as H.26x recommended by the Joint Photographic Experts Group (JPEG), the Moving Picture Experts Group (MPEG), and the International Telecommunication Union-Telecommunication Standardization Sector (ITU-T).

In particular, the present invention can be highly effective when used in an image coding system having an environment in which a very high compression rate is required due to the restricted band of a transmission channel. That is, the present invention can be applied to image telephone systems which have degradation of image quality because of the JPEG image service provided by the Internet and the restricted band of a telephone wire. Thus, the quality of image information provided by the Internet can be improved for a received image, and satisfactory picture quality within a restricted band can be received during video telephone calls. In addition, the present invention is applicable to low bit rate coding systems which are expected to be applied to very wide-ranging fields in the future.

As described above, the present invention can be applied in real time, and is easily realized as hardware by removing a blocking artifact using a non-repetitive and simple integer arithmetic operation. Also, the present invention can effectively remove the blocking artifact to prevent discontinuity between boundaries of a decoded image obtained by decoding a block-based coded image, while maintaining the edge and the texture.

What is claimed is:

1. A de-blocking method of de-blocking a received decoded image, obtained by decoding a block-based coded image, the method comprising the steps of:
   (a) obtaining first correction values by filtering pixels on a block boundary of the received decoded image using a first filtering coefficient when the decoded image is a planar surface;
   (b) obtaining second correction values by filtering pixels on a block boundary of the received decoded image using a second filtering coefficient when the decoded image is a complex surface; and
   (c) providing a corrected image by correcting the received decoded image using the first correction values when the decoded image is a planar surface or using the second correction values when the decoded image is a complex surface.

2. The method of claim 1, wherein in step (a) the first correction values are correction values for pixels on a block boundary.

3. The method of claim 2, wherein, assuming that a line of pixels spanning across two blocks arc denoted by . . . , A1, A0, B0, B1, . . . , and a block boundary is positioned between A0 and B0, the first filtering coefficient for obtaining first correction values for two pixels A0 and B0 on the block boundary is [1/4, −3/4, −1/4, 3/4], a negative sign and a positive sign being assigned to the first correction values for A0 and B0 respectively.

4. The method of claim 2, wherein the step (a) further comprises a step (a1) of obtaining correction values for pixels within a block by bilinearly interpolating pixels within the block using the correction values for the block boundary pixels.

5. The method of claim 1, wherein , assuming that a line of pixels spanning across two blocks are . . . , A1, A0, B0, B1, . . . , and a block boundary is positioned between A0 and B0, the correction values for at least some block boundary pixels of the received decoded image are calculated in step (b), and wherein the second filtering coefficient for obtaining second correction values of boundary pixels A0 and B0 is smaller than the first filtering coefficient, and wherein the second filtering coefficient for obtaining second correction values of other boundary pixels A1 and B1 is smaller than the second filtering coefficient for obtaining second correction values of boundary pixels A0 and B0.

6. The method of claim 5, wherein the second filtering coefficient for obtaining second correction values for the boundary pixels A0 and B0 is [1/8, −3/8, −1/8, 3/8], a negative sign and a positive sign being assigned to the second correction values for A0 and B0 respectively, the second filtering coefficient for obtaining second correction values for the boundary pixels A1 and B1 being [1/24, −1/8, −1/24, 1/8], a positive sign and a negative sign being assigned to the second correction values for A1 and B1 respectively.

7. The method of claim 1, wherein step (c) further comprises a step (c1) of determining whether the received decoded image is a planar surface or a complex surface.

8. The method of claim 7, wherein in step (c1); the determination of whether the received decoded image is a planar surface or a complex surface is made using a DC coefficient and at least some low-frequency coefficients among discrete cosine transform coefficients for decoded image blocks.

9. A de-blocking method of de-blocking a decoded image obtained by decoding block-based coded image, the method comprising the steps of:
   (a) determining whether the received decoded image is a planar surface;
   (b) obtaining correction values for pixels on a block boundary and within a block by filtering block boundary pixels using a first filtering coefficient and bilinearly interpolating the pixels within a block, if the decoded image is a planar surface; and
   (c) providing a corrected image by correcting the received decoded image using the obtained correction values.

10. The method of claim 9, wherein in step (a); the received decoded image is determined to be a complex surface if there are non-zero coefficients other than a DC coefficient and at least some low-frequency coefficients among discrete cosine transform coefficients for decoded image blocks, and otherwise the received decoded image is determined to be a planar surface.

11. The method of claim 9, wherein in step (b), assuming that a line of pixels spanning across two blocks are . . . , A1, A0, B0, B1, . . . , and a block boundary is placed between A0 and B0, the first filtering coefficient for obtaining correction values for pixels A0 and B0 on a block boundary is [1/4, −3/14, −1/4, 3/4], and a negative sign and a positive sign are given respectively to the correction values for A0 and B0.

12. The method of claim 9, further comprising the steps of:
   (d) obtaining correction values for at least some pixels on a block boundary by filtering block boundary pixels of the received decoded image using second filtering coefficients when the received decoded image is not a planar surface; and
   (e) providing a corrected image by correcting the received decoded image using the correction values obtained in step (d).

13. The method of claim 12, wherein, assuming that a line of pixels spanning across two blocks are . . . , A1, A0, B0, B1, . . . , and a block boundary is placed between A0 and B0, the correction values for at least some block boundary pixels of the received decoded image are calculated in step (d), in which the second filtering coefficient for obtaining correction values for the boundary pixels A0 and B0 is [1/8, −3/8, −1/8, 3/8], so that a negative sign and a positive sign are given respectively to the correction values for A0 and B0, and in which the second filtering coefficient for obtaining correction values for the boundary pixels A1 and B1 is [1/24, −1/8, −1/24, 1/8], so that a positive sign and a negative sign are given respectively to the correction values for A1 and B1.

14. A de-blocking apparatus for de-blocking a received decoded image obtained by decoding a block-based coded image, the apparatus comprising:

a block classifier for determining whether the received decoded image is a planar surface or a complex surface;

a first correction value calculator for calculating correction values for block boundary pixels by filtering the block boundary pixels of the received decoded image using a first filtering coefficient when the decoded image is a planar surface;

an interpolator for providing first correction values for pixels on the block boundary, and within a block by bilinearly interpolating the pixels within a block using the correction values for the block boundary pixels;

a second correction value calculator for calculating second correction values for at least some block boundary pixels by filtering the block boundary pixels of the received decoded image using a second filtering coefficient when the decoded image is a complex surface; and a corrector for providing a corrected image by correcting the received decoded image using the first correction values when the received decoded image is a planar surface or using the second correction values when the received decoded image is a complex surface.

15. The apparatus of claim 14, wherein the block classifier generates a block classification control signal for classifying the received decoded image as a complex surface if there are non-zero coefficients other than a DC coefficient and some low-frequency coefficients among discrete cosine transform coefficients for decoded image blocks, and otherwise, classifying the received decoded image as a planar surface.

16. The apparatus of claim 15, further comprising a selector for providing the first correction values to the corrector when the received decoded image is classified as the planar surface by the block classification control signal, and providing the second correction values to the corrector when the received decoded image is classified into the complex surface.

17. The apparatus of claim 14, wherein in the first correction value calculator, assuming that a line of pixels spanning across two blocks are . . . , A1, A0, B0, B1, . . . , and a block boundary is placed between A0 and B0, the first filtering coefficient for obtaining correction values for pixels A0 and B0 on a block boundary is [1/4, −3/4, −1/4, 3/4], and a negative sign and a positive sign are given respectively to the correction values for A0 and B0.

18. The apparatus of claim 14, wherein, assuming that a line of pixels spanning across two blocks are . . . , A1, A0, B0, B1, . . . , and a block boundary is placed between A0 and B0, the correction values for at least some block boundary pixels of the received decoded image are calculated by the second correction value calculator, in which the second filtering coefficient for obtaining correction values for the boundary pixels A0 and B0 is [1/8, −3/8, −1/8, 3/8], a negative sign and a positive sign being given respectively to the correction values for A0 and B0, and in which the second filtering coefficient for obtaining correction values for the boundary pixels A1 and B1 is [1/24, −1/8, −1/24, 1/8], a positive sign and a negative sign being given respectively to the correction values for A1 and B1.

19. A method of de-blocking a received decoded block-based coded image, the method comprising:

determining whether the decoded image is a planar image or a complex image;

calculating first correction values when the decoded image is a planar surface;

calculating second correction values when the decoded image is a complex surface;

correcting the received decoded image using the first correction values when it is determined that the decoded image is a planar image; and correcting the received decoded image using the second correction values when it is determined that the decoded image is a complex image.

20. A method as set forth in claim 19, further comprising performing two-dimensional interpolation on the decoded image when it is determined that the decoded image is a planar image.

21. A method as set forth in claim 19, wherein said determining operation comprises determining whether certain coefficients corresponding to a discrete cosine transformation (DCT) of the decoded image are non-zero.

22. A method as set forth in claim 21 wherein said determining operation further comprises:

determining that the decoded image is a complex image if the discrete cosine transformation (DCT) has a non-zero coefficient corresponding to an AC component other than the two lowest-order AC components; and determining that the decoded image is a planar image if the discrete cosine transformation (DCT) does not have a non-zero coefficient corresponding to an AC component other than the two lowest-order AC components.

* * * * *